(12) United States Patent
Fukumura et al.

(10) Patent No.: US 7,746,079 B2
(45) Date of Patent: Jun. 29, 2010

(54) ION CURRENT DETECTING APPARATUS FOR INTERNAL COMBUSTION ENGINE

(75) Inventors: Yoshiyuki Fukumura, Osaka (JP); Mitsuhiro Izumi, Osaka (JP); Shinobu Sugisaki, Osaka (JP); Tsutomu Kusuhara, Osaka (JP)

(73) Assignee: Diamond Electric MFG. Co., Ltd., Osaka-Shi (JP)

( * ) Notice: Subject to any disclaimer, the term of this patent is extended or adjusted under 35 U.S.C. 154(b) by 568 days.

(21) Appl. No.: 11/632,928

(22) PCT Filed: Aug. 9, 2005

(86) PCT No.: PCT/JP2005/014546

§ 371 (c)(1),
(2), (4) Date: Jan. 19, 2007

(87) PCT Pub. No.: WO2006/016566

PCT Pub. Date: Feb. 16, 2006

(65) Prior Publication Data

US 2008/0030197 A1   Feb. 7, 2008

(30) Foreign Application Priority Data

Aug. 9, 2004   (JP) .............................. 2004-232552

(51) Int. Cl.
*F02P 17/00*   (2006.01)
(52) U.S. Cl. .................. 324/393; 324/402; 324/399
(58) Field of Classification Search ................ None
See application file for complete search history.

(56) References Cited

U.S. PATENT DOCUMENTS

| | | | | |
|---|---|---|---|---|
| 4,951,172 A | * | 8/1990 | Steinman et al. ............ 361/213 |
| 5,322,045 A | * | 6/1994 | Hisaki et al. ............ 123/406.14 |
| 5,418,461 A | | 5/1995 | Maeda et al. |
| 5,561,239 A | * | 10/1996 | Yasuda .................... 73/35.08 |
| 5,747,670 A | * | 5/1998 | Takahashi et al. ........... 73/35.08 |
| 5,777,216 A | * | 7/1998 | Van Duyne et al. ...... 73/114.67 |
| 6,691,555 B2 | * | 2/2004 | Ohkama et al. ............ 73/35.08 |
| 7,348,782 B2 | * | 3/2008 | Ando ........................ 324/399 |

(Continued)

FOREIGN PATENT DOCUMENTS

JP   04-194367 A   7/1992

(Continued)

*Primary Examiner*—Thomas Valone
(74) *Attorney, Agent, or Firm*—Birch, Stewart, Kolasch & Birch, LLP (57) ABSTRACT

An ion current detecting apparatus includes a capacitor C that is charged as a spark plug 3 discharges, a Zener diode ZD that limits a maximum voltage of the capacitor C while charging, a detection resistor R2 through which a discharge current of the capacitor C flows, and a comparator circuit 5 that compares a current value of the detection resistor R2 with a predetermined value. A charge quantity Q of the capacitor C at discharge start is set so that, as a consequence of a discharging operation of the capacitor C, discharge duration required until the current value of the detection resistor R2 falls below the predetermined value becomes longer than time duration in which the ion current generated by fuel combustion in the engine combustion chamber lasts. The ion current detecting apparatus automatically detects degradation in an insulation resistance in the spark plug, ensuring normal operation in engine control.

9 Claims, 5 Drawing Sheets

U.S. PATENT DOCUMENTS

2003/0006774 A1   1/2003   Ohkama et al.

FOREIGN PATENT DOCUMENTS

| | | | |
|---|---|---|---|
| JP | 5-306673 | A | 11/1993 |
| JP | 11-37031 | A | 2/1999 |
| JP | 11-37900 | A | 2/1999 |
| JP | 11-336649 | A | 12/1999 |
| JP | 2003-21034 | A | 1/2003 |
| JP | 2003-286892 | A | 10/2003 |

* cited by examiner

$$L\frac{di}{dt} + Ri + \frac{1}{C}\int i\,dt = 0$$

$$L\frac{d^2q}{dt^2} + R\frac{dq}{dt} + \frac{1}{C}q = 0$$

$$\begin{cases} L = L2 \\ R = R1 + r + Rk \end{cases}$$

ION CURRENT DETECTING APPARATUS FOR INTERNAL COMBUSTION ENGINE

TECHNICAL FIELD

The present invention relates to an ion current detecting apparatus for an internal combustion engine, and, in particular, to an ion current detecting apparatus capable of determining degradation of an insulation resistance in a current path through which an ion current flows.

BACKGROUND ART

A typical ignition device of an internal combustion engine includes a spark plug disposed in a combustion chamber, an ignition coil that supplies energy on combustion to the spark plug, and an ECU (Electronic Control Unit) that controls ignition timing of the ignition coil.

For such an ignition device, it has been proposed to detect an ion current generated after combustion in the combustion chamber. According to a combustion state detected based on the ion current, it is possible to grasp an operation state of the internal combustion engine, or to realize various electronic controls such as lean combustion.

In general, an apparatus for detecting an ion current includes a capacitor that holds an electric charge caused by a current from the spark plug, a Zener diode that limits a voltage of the capacitor, and a load resistor that detects the ion current (Patent Documents 1 and 2).

Patent Document 1: Japanese Unexamined Patent Publication No. 04-194367

Patent Document 2: Japanese Unexamined Patent Publication No. 11-037031

DISCLOSURE OF THE INVENTION

Problems to be Solved by the Invention

A spark plug is provided with a center electrode and a ground electrode. Further, the spark plug receives a high voltage at the center electrode from an ignition coil, and causes a discharge spark between the center electrode and the ground electrode, thereby combusting an air-fuel mixture inhaled into a combustion chamber. However, the spark plug may degrade in its ignition performance because of wear-out of the electrodes due to the use over years, as well as because of so-called "smoldering".

Here, the "smoldering" refers to a phenomenon in which adhesion of carbon generated during the combustion to portions of the electrodes results in decrease in an insulation resistance between the center electrode and the ground electrode. When such a spark plug whose insulation resistance is degraded is used, a leakage current in the spark plug is also detected by an ion current detecting unit. As a result, it is not possible to correctly detect an ion current as originally intended. In addition, controlling an engine based on the incorrectly detected ion current not only fails to realize a desired performance, but may results in a trouble.

Further, there is a case where causes other than the "smoldering" may lead to the degradation of the insulation performance in an ion current path, such as a secondary coil and the spark plug through which the ion current flows. An oversight of such causes prevents the ion current from being correctly detected, and may also result in a trouble in the engine.

In view of the above problems, Patent Document 1 merely discloses a circuit for detecting the ion current, and does not address any countermeasure to the degradation in the insulation performance in the ion current path at all. In addition, the circuit disclosed in Patent Document 1 is not quite mature as an ion current detection circuit, and unable to detect a weak ion current with a high degree of accuracy.

The same applies to Patent Document 2. With the invention disclosed in Patent Document 2, it is not able to distinguish the ion current generated during normal combustion from the leakage current flowing through the degraded spark plug, and therefore greatly undermines reliability of the detected ion current. Further, in Patent Document 2, similarly to the invention of Patent Document 1, a load resistor for detecting the ion current is essential. Because this load resistor gives a direct influence on a discharging characteristic of a capacitor, it is not possible to design a circuit best suited for detecting the degradation in the insulation in the ion current path.

The present invention is contrived in view of the above problems, and an object thereof is to provide an ion current detecting apparatus capable of quickly and automatically detecting the degradation in the insulation resistance in the ion current path to ensure a normal operation in engine control.

Means for Solving the Problems

In order to achieve the above object, the present invention provides an ion current detecting apparatus including: a capacitor that is charged as a spark plug discharges; a voltage limiting element that limits a maximum voltage of the capacitor while charging; a detection resistor through which a discharge current of the capacitor flows; and a comparator circuit that compares a current value of the detection resistor with a predetermined value, wherein degradation of an insulation resistance in an ion current path through which an ion current flows is determined either by: providing a prohibiting step in which fuel supply to a combustion chamber of an internal combustion engine is prohibited, and determining an output from the comparator circuit in the prohibiting step, or setting a charge quantity of the capacitor at discharge start so that, as a consequence of a discharging operation of the capacitor, discharge duration required until the current value of the detection resistor falls below the predetermined value becomes longer than time duration in which the ion current generated by fuel combustion in the combustion chamber in the internal combustion engine lasts.

Effect of the Invention

According to the above described present invention, with the ion current detecting apparatus for the internal combustion engine of the above configuration, the ion current may be detected with high reliability, eliminating the influences from such as the leakage current in the spark plug. As a result, it is possible to ensure the detection of combustion state in the internal combustion engine, enabling a high degree of combustion control.

DESCRIPTION OF THE REFERENCE NUMERALS AND SYMBOLS 3 spark plug
5 comparator circuit
C capacitor
ZD voltage limiting element
R2 detection resistor
Q charge quantity

BEST MODE FOR CARRYING OUT THE INVENTION

Figure 1:
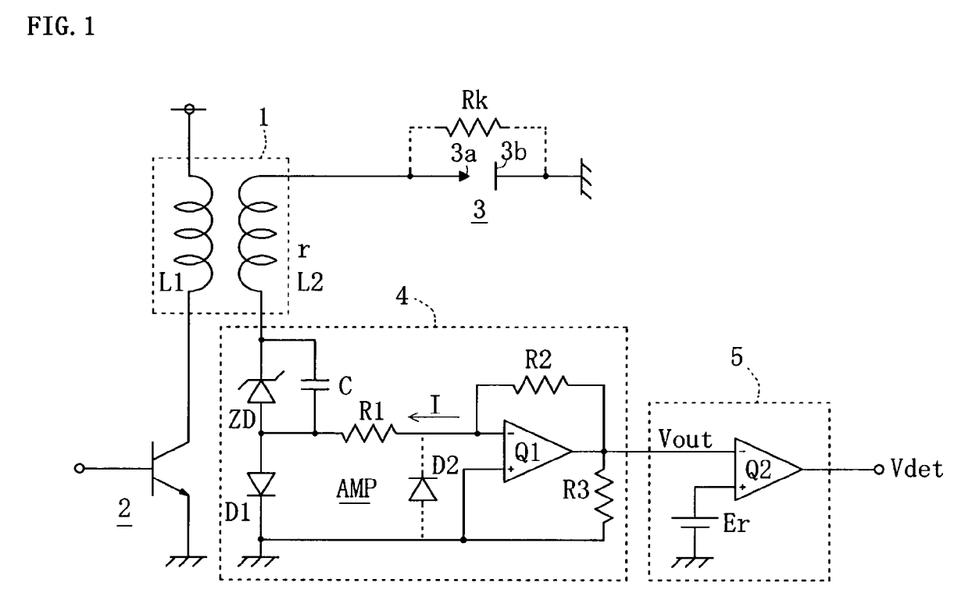
FIG. 1 is a circuit diagram illustrating an ion current detecting apparatus according to an embodiment.

Hereinafter, the present invention is described in detail according to an embodiment. FIG. 1 is a circuit diagram illustrating an ion current detecting apparatus according to the present embodiment. This detecting apparatus includes an ignition coil 1 configured as a booster transformer by a primary coil L1 and a secondary coil L2, an igniter 2 that controls a current from the primary coil L1 in an intermittent manner, a spark plug 3 that is operated to discharge by a high voltage induced by the secondary coil L2, an ion current detection circuit 4 that is connected in series with the secondary coil L2, and a comparator circuit 5 that compares an output voltage Vout from the ion current detection circuit 4 with a reference voltage Er to output a detection voltage Vdet.

The spark plug 3 provided with a center electrode 3a and a ground electrode 3b can be in a smoldering state with an insulation resistance Rk reduced. Therefore, a leak resistance Rk between the electrodes is shown by a dashed line in FIG. 1.

The ion current detection circuit 4 includes a bias capacitor C charged by a discharge current from the spark plug 3, a Zener diode ZD connected in parallel with the capacitor C to restrict a charging voltage of the capacitor C, a diode D1 connected in series with the Zener diode ZD, and an amplifier AMP connected to both ends of the diode D1.

Anode terminals of the Zener diode ZD and the diode D1 are connected directly with each other, while a cathode terminal of the diode D1 is connected with a ground line. Further, a cathode terminal of the Zener diode ZD is connected with the secondary coil L2.

The amplifier AMP of the ion current detection circuit 4 includes: an amplifying element Q1 having an inverting terminal, a non-inverting terminal, and an output terminal; an input resistor R1 connected to the inverting terminal of the amplifying element Q1; a feedback resistor R2 connected between the inverting terminal and the output terminal of the amplifying element Q1; and a load resistor R3 connected between the output terminal of the amplifying element Q1 and the ground line. Here, a diode D2 for protecting the amplifying element Q1 may also be connected between the inverting terminal of the amplifying element Q1 and the ground line.

In this embodiment, an operational amplifier is employed as the amplifying element Q1. An operational amplifier has input impedance that is substantially infinite ($\cong\infty$), and includes an imaginary short between the inverting terminal and the non-inverting terminal. Accordingly, an input current I shown in the drawings flows both through the input resistor R1 and the feedback resistor R2, and an output voltage Vout from the amplifier AMP is a product of the input current I and the feedback resistor R2 (Vout=I×R2). In other words, in this amplifier AMP, the feedback resistor R2 functions as a detection resistor of the input current I.

The comparator circuit 5 includes a comparator Q2 and a reference voltage Er supplied to a non-inverting input terminal of the comparator Q2. Here, the reference voltage Er is a combustion reference voltage for detecting a combustion period (time). In the comparator circuit 5, the output voltage Vout from the ion current detecting unit 4 is supplied to an inverting input terminal of the comparator Q2. Consequently, in a combustion state where Vout>Er, a detection voltage Vdet at L level is outputted from the comparator Q2.

Figure 3:
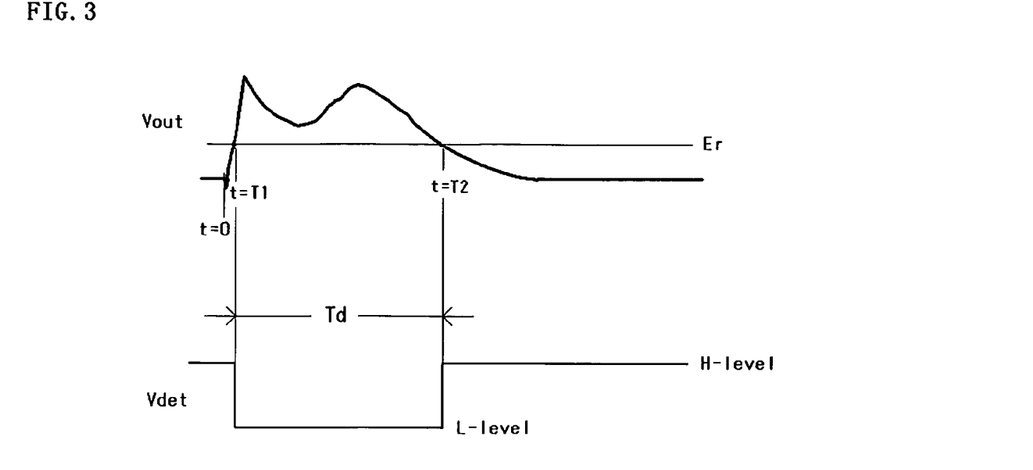
FIG. 3 is a time chart showing relation between temporal change of an ion current and a detection voltage during normal combustion.

The detection voltage Vdet is supplied to an engine control unit which is not shown in the drawings, and it is possible to determine whether or not a combustion state is favorable based on an ion current (ion voltage Vout, in practice) during time duration Td in which the detection voltage Vdet is at L level (see FIG. 3). However, when the spark plug 3 is in the smoldering state, a leakage current similar to the ion current also flows (see FIG. 5).

Figure 4:
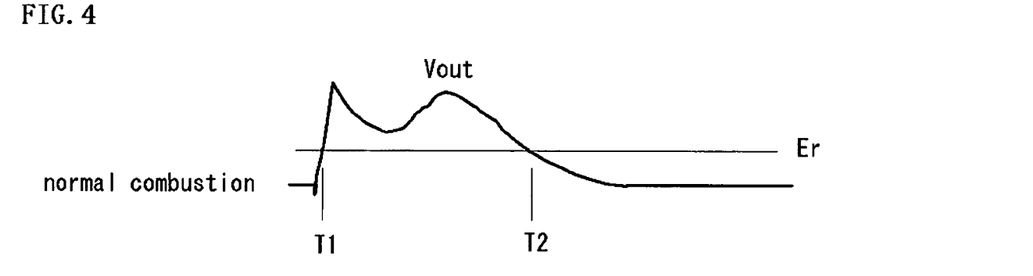
FIG. 4 is a time chart showing the temporal change of the ion current during normal combustion.

FIG. 4 shows the output voltage Vout from the ion current detecting unit during normal combustion, and illustrates a fact that the output voltage Vout based on the ion current exceeds the reference voltage Er from a timing t=T1 to a timing t=T2.

Figure 5:
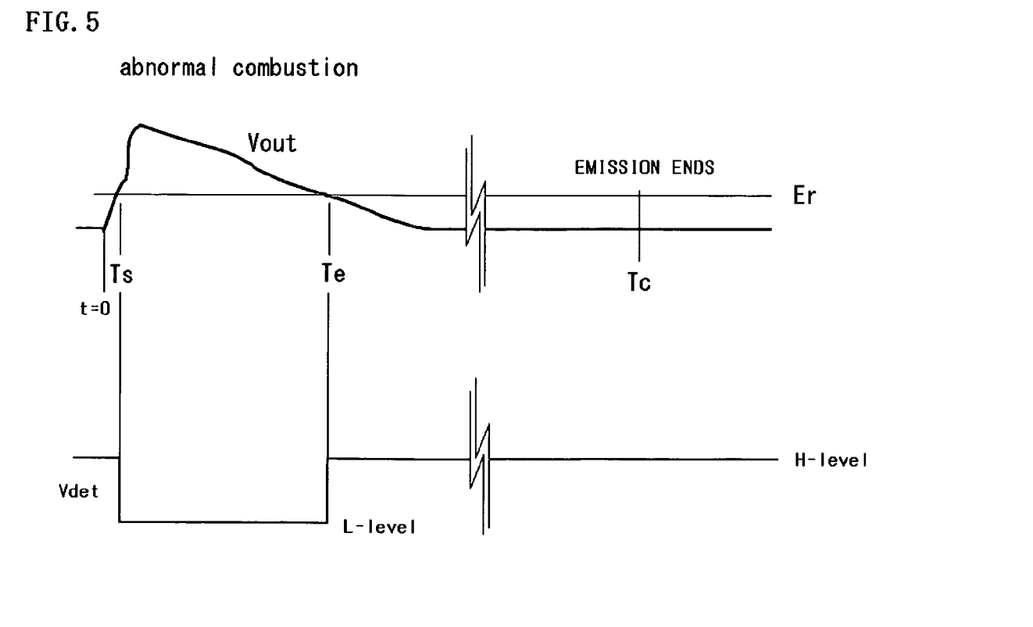
FIG. 5 is a time chart showing relation between temporal change of a discharge current and the detection voltage during smoldering combustion.

In contrast, FIG. 5 shows the output voltage Vout from the ion current detecting unit during abnormal combustion, and illustrates a fact that the output voltage Vout based on the leakage current from the spark plug 3 exceeds the reference voltage Er from a timing t=Ts to a timing t=Te. Depending on a value of the leak resistance Rk, T2$\cong$Te is established, and as a result, it becomes completely impossible to distinguish the leakage current in the spark plug 3 from the ion current.

Figure 6:
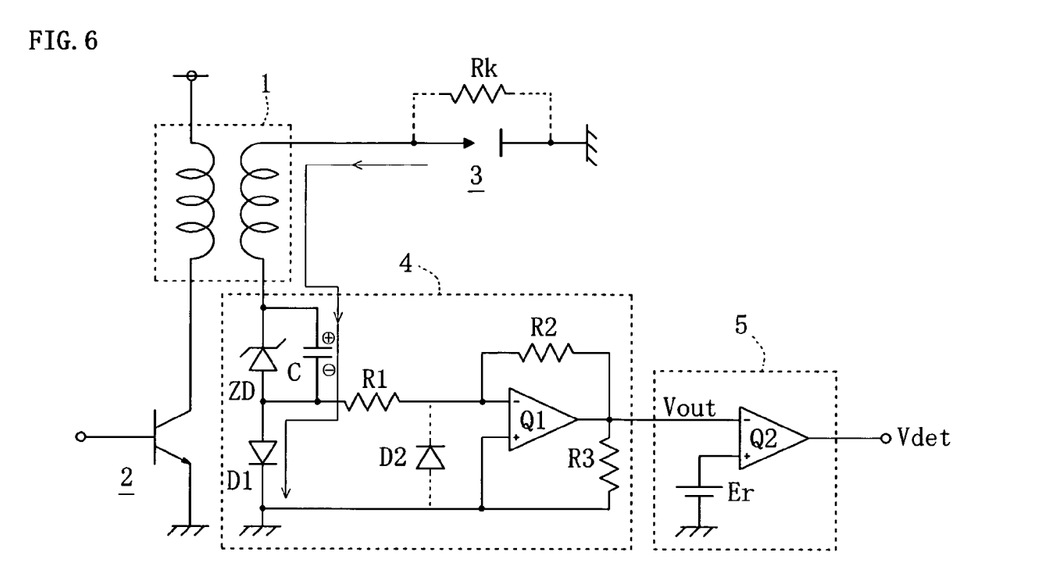
FIG. 6 is a diagram illustrating an operation of the ion detecting apparatus during discharge of a spark plug.
Figure 7:
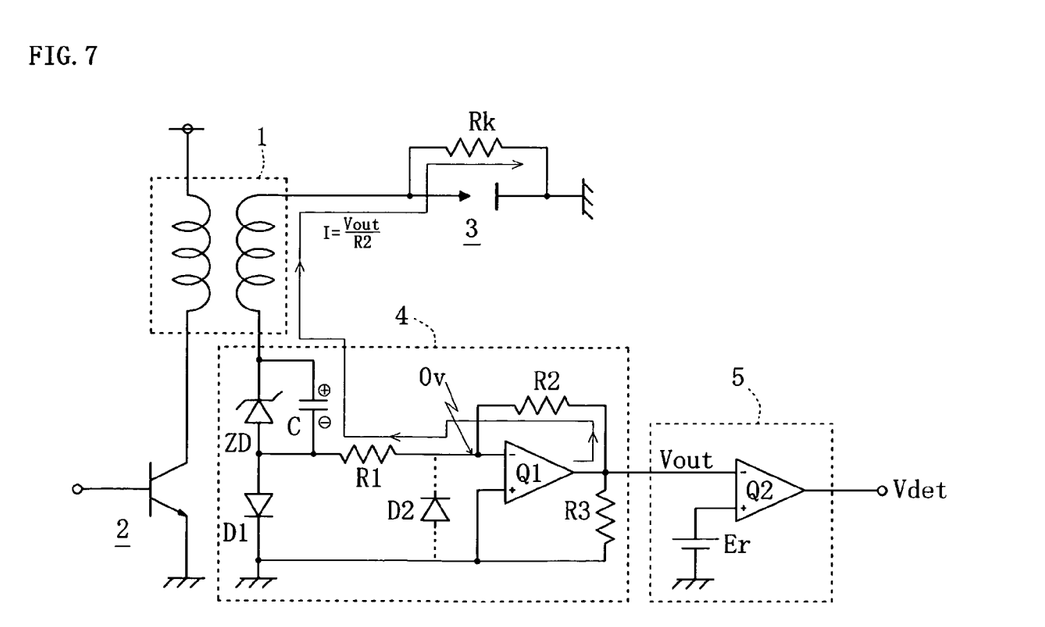
FIG. 7 is a diagram illustrating an operation of the ion detecting apparatus during discharge of a capacitor.

Next, an operation of the ion current detecting unit 4 will be further described in detail based on FIG. 6 and FIG. 7. As shown in FIG. 6, upon generation of a negative high voltage in the secondary coil L2, the spark plug 3 performs an ignition discharge and an ignition current charges the capacitor C. At this time, because the capacitor C is connected in parallel with the Zener diode ZD, voltages at both ends of the capacitor C match a breakdown voltage Vz of the Zener diode ZD. During the discharge, because the diode D1 is short (ON), the current that flow through the input resistor R1 and other circuit elements may be ignored.

Then, upon extinction of the high voltage at the secondary coil L2, a bias voltage charged into the capacitor C is discharged through a path shown in FIG. 7. Specifically, the discharge current flows the path from the output terminal of the amplifying element Q1, to the feedback resistor R2, to the input resistor R1, to the capacitor C, to the secondary coil L2, and to the spark plug 3. At this time, when the spark plug 3 is in the smoldering state, the discharge current flows through the leak resistance Rk regardless of the presence of the ion current. The diode D1 is in an OFF state during the discharge operation of the capacitor C, because the cathode terminal of the diode D1 is connected to the ground line.

Figure 2:
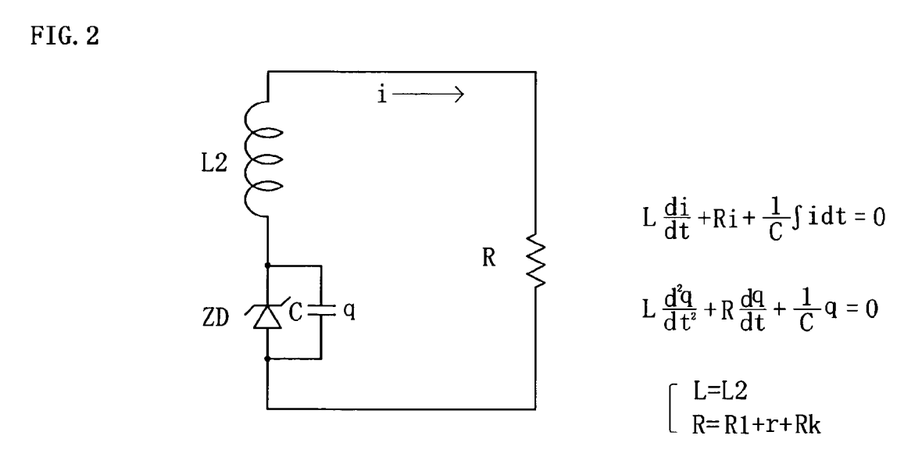
FIG. 2 illustrates an equivalent circuit for analyzing a circuit operation of FIG. 1 in a smoldering state.

Next, the operation during discharge of the capacitor C is theoretically described. FIG. 2 shows an equivalent circuit when the spark plug 3 is in the smoldering state. Here, resistor R is a total of a value of the input resistor R1 of the amplifier AMP, a loss resistor r of the secondary coil, and the leak resistance Rk. Although the discharge current of the capacitor also flows through the feedback resistor R2 and an output unit of the amplifying element Q1, it is considered that R≅R1+r+Rk is established, because the inverting input terminal of the amplifying element Q1 imaginary shorts and at a zero potential. In addition, L indicates a reactance of the secondary coil L2.

In FIG. 2, taking that the discharge current is i and an electric charge of the capacitor C is q, circuit equations are established as follows.

$$\left[\frac{di}{dt} + Ri + \frac{1}{C}\int i dt = 0\right.$$

$$\left[\frac{d^2q}{dt^2} + R\frac{dq}{dt} + \frac{1}{C}q = 0\right.$$

When these circuit equations are solved under a condition of R>2SQR(L/C), a following equation 1 is derived. Here, SQR signifies a symbol for square root. Further, Q in the equation 1 is an amount of the electric charge of the capacitor C at an initial state (t=0) (unit is coulomb (C)). According to a capacitance C of the capacitor and the breakdown voltage Vz of the Zener diode ZD, relation of Q=C×Vz is established.

$$i = Q\frac{\alpha^2 - \beta^2}{\beta}\varepsilon^{-\alpha t}\sinh\beta t \quad \text{(equation 1)}$$

$$R > 2\sqrt{\frac{L}{C}}$$

Further, $\alpha$ and $\beta$ in the equation 1 may be given in an equation 2.

$$\alpha = \frac{R}{2L}$$

$$\beta = \frac{1}{2L}\sqrt{R^2 - 4\frac{L}{C}} \quad \text{(equation 2)}$$

$$Q = C \times Vz$$

By modifying the equation 1 for the electric charge Q in an initial state, a following equation 3 may be derived. Here, sin hX is a sine hyperbolic given when sin hX=(eX−e−X)/2.

$$Q = \frac{i}{\frac{\alpha^2 - \beta^2}{\beta}\varepsilon^{-\alpha t}\sinh\beta t} \quad \text{(equation 3)}$$

As shown in FIG. 5, the discharge current i given in the equation 1 starts to increase from a timing t=0 when the discharge starts, and then starts to decrease after reaching a maximum value. Accordingly, the output voltage Vout (=i×R2) of the ion current detecting unit 4 also starts to increase from the timing t=0 when the discharge starts, eventually exceeds the reference voltage Er at a timing of T=Ts, then starts to decrease after reaching a maximum value, and falls below the reference voltage Er at a timing of t=Te. Therefore, the detection voltage Vdet of the comparator Q2 is at L level in a period of Ts≦t≦Te (FIG. 5).

As described previously, because the non-inverting terminal and the inverting terminal of the operational amplifier Q1 are imaginary at the same potential, the discharge current i at a certain moment (time t) is given by i=Vout/R2 (equation 4) in relation with the output voltage Vout at this certain moment. Accordingly, i=Er/R2 (equation 4') is established at the timing of t=Te. By substituting this into the equation 1, a following equation 5 is established.

$$\frac{Er}{R2} = Q\frac{\alpha^2 - \beta^2}{\beta}\varepsilon^{-\alpha Te}\sinh\beta Te \quad \text{(equation 5)}$$

Then, by solving the equation 5 relating to Te, it is possible to calculate the timing (t=Te) at which the output voltage Vout falls below the reference voltage Er. Specifically, the timing (t=Te) at which the output voltage Vout falls below the reference voltage Er may be determined based on the charge quantity Q of the capacitor C in the initial state (see equation 5).

As described previously by comparing FIG. 4 and FIG. 5, depending on the value of the leak resistance Rk, it becomes difficult to distinguish the output voltage Vout based on the ion current (FIG. 4) from the output voltage Vout based on the leakage current (FIG. 5). However, as confirmed from the above equation 5, a timing at t=Te may be set appropriately according to the value of the charge quantity.

Therefore, in this embodiment, the charge quantity Q is set so that a value of Te substantially matches during a time period from a capacitor discharge start time (t=0) to a emission ending time Tc that is measured. When employing such a charge quantity Q, if Rk≠∞ when the spark plug 3 is in the smoldering state, the detection voltage Vdet maintains at L level from t=Ts to t=Tc. However, it is normally impossible that the ion current keeps flowing until the timing t=tc when the emission ends, and therefore, the insulation degradation in an ion current path such as the smoldering state in the spark plug 3 may be determined with the detection voltage Vdet at L level that is maintained until the timing t=Tc.

In general, while an engine completes one cycle of operation which starts from an inhale step, compression step, to combustion step, and ending with emission step, a time measured from the capacitor discharge start time (t=0) until the end of the emission varies depending on the number of rotations (rpm) of the engine. Therefore, in this embodiment, a value for the emission ending time Tc when the number of rotations is the smallest (specifically, 600 rpm) is employed, and Te is set so as to substantially match this Tc.

In the meantime, while the value of Te is set based on the charge quantity Q in the above description, setting Te may not necessarily be based on the charge quantity Q, and may be based on any value shown by the equation 5, such as the input resistor R1. It is understood that the value of the charge quantity Q is determined based on the capacitance of the capacitor C and/or the breakdown voltage Vz of the Zener diode. Further, Te≅Tc is set in the above description, the relation is not necessarily limited to this. It is sufficient by setting the value of Te to a timing at which it is impossible to detect the ion current.

Figure 8:
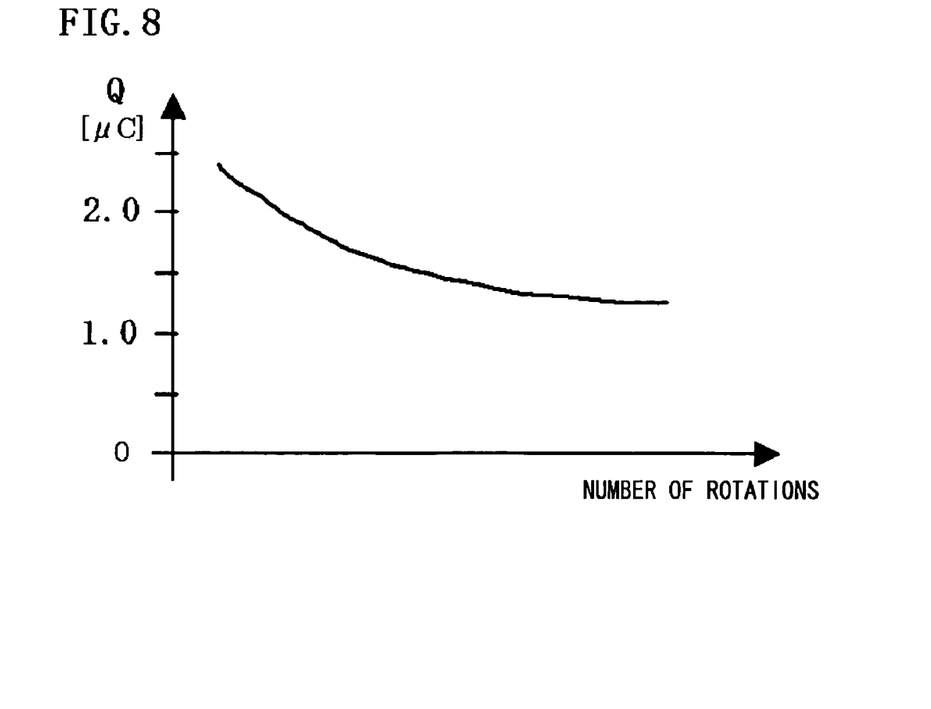
FIG. 8 is a diagram showing results of an experiment for confirming an amount of an electric charge that is required for the capacitor in practice.

FIG. 8 shows results of an experiment for confirming the charge quantity Q required in order to set to Te≅Tc in a typical ion current detection circuit of practical use. The results shows that while the required charge quantity Q increases as the number of rotations of the engine decreases, Te≅Tc may be established by satisfying a condition of Q>1.0 (μC) in a high rotation state and Q>2.5 (μC) even in a low rotation state. Although the required charge quantity Q changes depending on the value of the leak resistance Rk, the leak resistance Rk that can be problematic in general may take various values such as 2 MΩ and 20 MΩ. Accordingly, the experiment in FIG. 8 is performed in a condition of Rk=0 assuming the worst case.

Further, modifying a circuit structure of the ion current detection circuit 4 from that shown in FIG. 1, or changing a circuit constant (such as the resistor value R1 and a inductance value of the secondary coil L2) of the ion current detection circuit 4 shown in FIG. 1 can cause a slight change in the characteristics. However, in either case, it is confirmed that Te≅Tc may be established by satisfying the condition of Q>2.5 (μC).

In the meantime, it is often the case that the smoldering of the spark plug 3 becomes problematic immediately after starting the engine. Further, the influence of the smoldering can be reduced as a certain period of time elapses after the engine start.

Therefore, it is also preferred that the fuel injection is not performed immediately after the engine start, and the smoldering of the spark plug is determined based on an output from the ion current detection circuit 4 at this time. During a few cycles in which a starting motor rotates, the fuel injection is not especially required. In addition, it is also effective to determine the state inside a cylinder based on a crank and a cam sensor of the engine without injecting the fuel. Therefore, it the smoldering may be determined at a starting timing like this.

When the fuel is not injected at this starting timing, it is impossible for the ion current to be generated. If the detection voltage Vdet marks L level in such a case, this indicates nothing but the fact that the insulation resistance Rk in the ion current path is degraded, such that the spark plug 3 is in the smoldering state. Such an aspect of a second embodiment is also advantageous in that it is not required to set the charge quantity Q to establish Te≅Tc.

Figure 9:
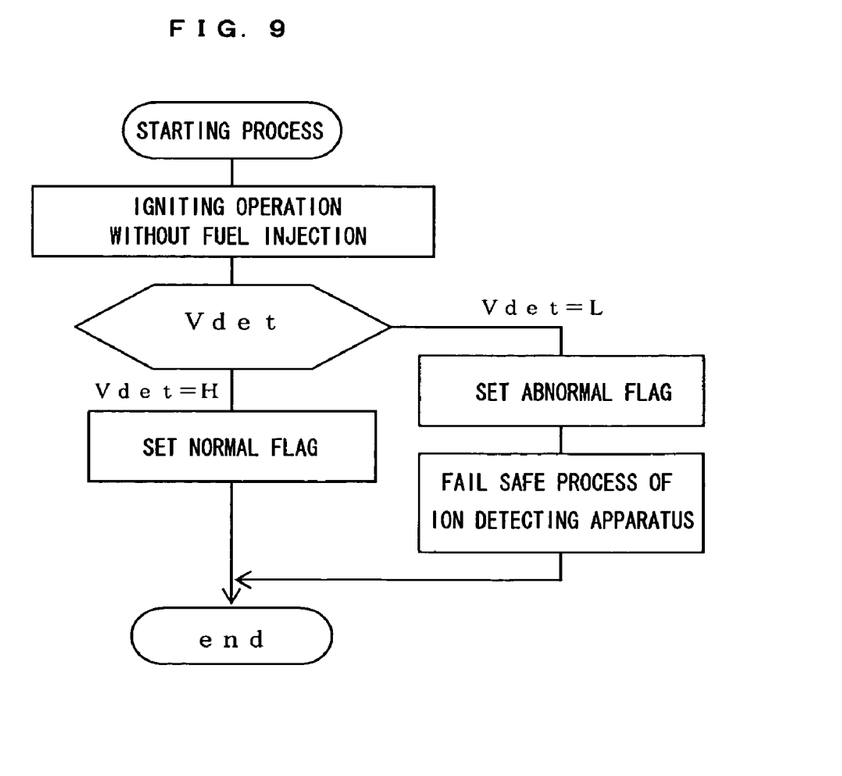
FIG. 9 is a flow chart illustrating another aspect of the embodiment of the present invention.

FIG. 9 is a flow chart of an exemplary operation of the above described second embodiment. In this operation, the engine is started without injecting the fuel, and when the detection voltage Vdet at L level is detected, a fail safe process of the ion detecting apparatus is performed. The fail safe process may be appropriately designed, and such a design of notifying the abnormal state to a driver and stopping the combustion control by the ion current, for example, is conceivable.

Hereinbefore, although the present invention is specifically described, these specific descriptions are not intended for limiting the present invention. In other words, various modifications may be possible without departing from the spirit of the present invention, and all of such modifications fall within the scope of the present invention.

For example, in the first embodiment shown in FIG. 1, the time duration in which the current value of the detection resistor (the feedback resistor R2) of the ion current is maintained at a higher level than the predetermined value is detected by the comparator circuit 5, and the degradation of the insulation resistance Rk in the ion current path is determined based on the detected time duration. However, the present invention is not limited to such a method.

Figure 10:
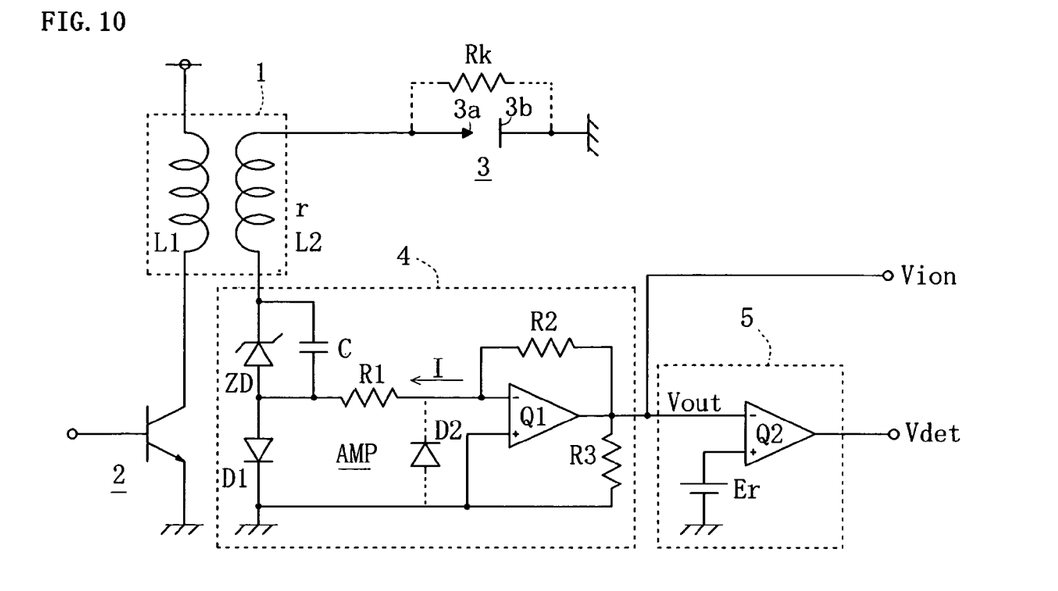
FIG. 10 illustrates another exemplary circuit of the ion current detecting apparatus.

For example, as shown in FIG. 10, the ion voltage Vout is separately outputted from the ion current detection circuit 4, and the degradation of the insulation resistance Rk in the ion current path may be determined based on an integration value of the outputted ion voltage Vion. In this case, the time duration in which an integral treatment is performed is a period in which the detection voltage Vdet outputted from the comparator circuit 5 is at L level, but the time duration is not required to be set as long as in the case of the first embodiment. Specifically, the period in which the detection voltage Vdet is at L level does not necessarily last until the emission ends (t=Tc). It is sufficient to make the time duration becomes longer than the time duration of the original ion current by setting the charge quantity of the capacitor at the discharge start.

Figure 11:
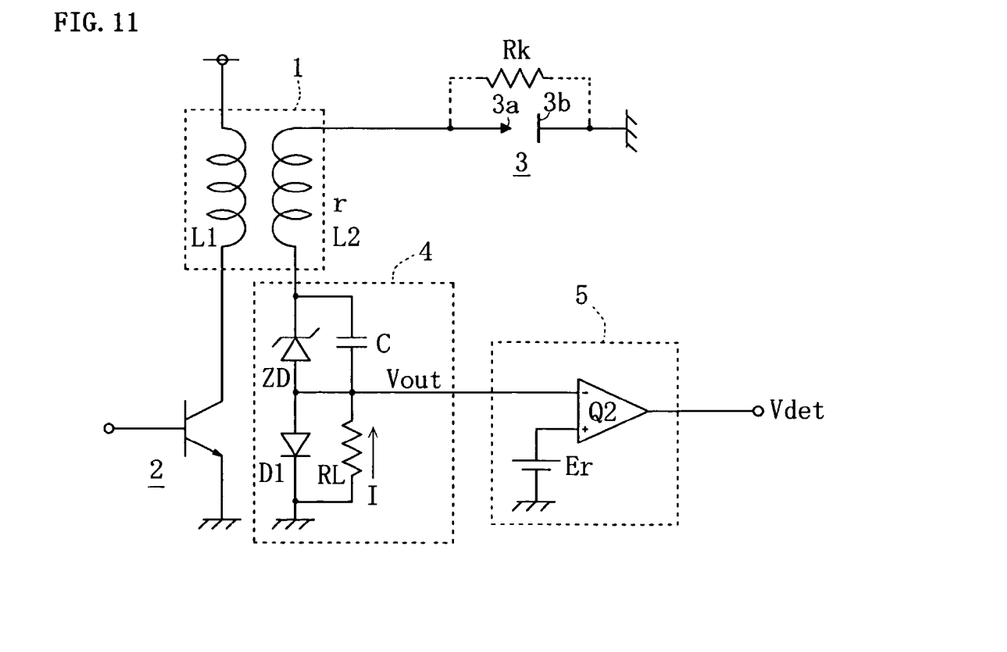
FIG. 11 illustrates yet another exemplary circuit of the ion current detecting apparatus.

Further, the ion current detection circuit 4 does not necessarily require the amplifying element Q1, and the present invention may be realized with the circuit shown in FIG. 11 in which the amplifier AMP is omitted. However, in the circuit shown in FIG. 11, a load resistor RL is connected between the capacitor C and the ground line. Accordingly, the circuit shown in FIG. 11 has the same drawback as the circuits of Patent Documents 1 and 2.

Specifically, in order to detect a weak ion current without fail, the load resistor RL has to be set large. However, in this case, a resistance value R in the equivalent circuit in FIG. 2 becomes large, and the discharging characteristic of the capacitor C varies in proportion as the resistance value R becomes larger. This allows little flexibility in design. In contrast, the circuit in FIG. 1, only the input resistor R1 influences the discharging characteristic of the capacitor C, and the value of the feedback resistor R2 does not affect the discharging characteristic of the capacitor C. Therefore, by setting the feedback resistor R2 large without affecting the discharging characteristic of the capacitor C, it is possible to obtain a desired level of the ion voltage Vout. In other words, because the amplifier circuit AMP is an inverting amplifier with an amplification factor −R2/R1, the ion detecting circuit 4 shown in FIG. 1 is advantageous in that the amplification factor of the ion current may be set freely based on the feedback resistor R2.

The invention claimed is:

1. An ion current detecting apparatus for an internal combustion engine, comprising:
 a capacitor that is charged as a spark plug discharges;
 a voltage limiting element that limits a maximum voltage of the capacitor while charging;
 a detection resistor through which a discharge current of the capacitor flows; and
 a comparator circuit that compares a current value of the detection resistor with a predetermined value,
 wherein a stage prior to the comparator circuit is provided with an amplifying element including an inverting input terminal, a non-inverting input terminal, and an output terminal, and
 the comparator circuit compares a voltage value of the output terminal of the amplifying element with a fixed reference voltage value, and
 wherein the amplifying element is connected with an input resistor provided between the capacitor and the inverting input terminal, and a feedback resistor provided between the inverting input terminal and the output terminal, and
 the feedback resistor functions as the detection resistor wherein
 degradation of an insulation resistance in an ion current path through which an ion current flows is determined either by:

providing a prohibiting step in which fuel supply to a combustion chamber of an internal combustion engine is prohibited, and determining an output from the comparator circuit in the prohibiting step, or setting a charge quantity of the capacitor at discharge start so that, as a consequence of a discharging operation of the capacitor, discharge duration required until the current value of the detection resistor falls below the predetermined value becomes longer than time duration in which the ion current generated by fuel combustion in the combustion chamber in the internal combustion engine lasts.

2. The ion current detecting apparatus according to claim 1, wherein as a consequence of a comparison operation by the comparator circuit in the prohibiting step, the insulation resistance in the ion current path is determined to be degraded if the current value of the detection resistor exceeds the predetermined value.

3. The ion current detecting apparatus according to claim 2, wherein the prohibiting step is provided at a starting time of the internal combustion engine.

4. The ion current detecting apparatus for an internal combustion engine according to claim 1, wherein the comparator circuit detects time duration in which the current value of the detection resistor is maintained at a higher level than the predetermined value, and the degradation of the insulation resistance in the ion current path is determined based on the detected time duration.

5. The ion current detecting apparatus for an internal combustion engine according to claim 1, wherein while the comparator circuit detects time duration in which the current value of the detection resistor is maintained at a higher level than the predetermined value, the degradation of the insulation resistance in the ion current path is determined based on the current value of the detection resistor during the detected time duration.

6. The ion current detecting apparatus for an internal combustion engine according to claim 5, wherein the degradation of the insulation resistance in the ion current path is determined based on a value of current integration of the detection resistor during the time duration.

7. The ion current detecting apparatus for an internal combustion engine according to claim 1, wherein since a time measured from the capacitor discharge start until an ending time of an emission varies depending on a number of rotations (rpm) of the engine, the apparatus is adapted to employ a value for the ending time of the emission when the number of rotations of the engine is at a minimum number of rotations.

8. The ion current detecting apparatus for an internal combustion engine according to claim 1, wherein the voltage limiting element is a Zener diode connected in parallel with the capacitor.

9. The ion current detecting apparatus for an internal combustion engine according to claim 7, wherein the charge quantity is set to be no less than 2.5 μC.

\* \* \* \* \*